United States Patent
Yoo et al.

(10) Patent No.: US 7,882,133 B2
(45) Date of Patent: Feb. 1, 2011

(54) APPARATUS FOR PROCESSING INTEGRATED QUERY FROM VARIOUS SENSOR NETWORKS AND METHOD THEREOF

(75) Inventors: Jae-Jun Yoo, Daejon (KR); Jun-Wook Lee, Chungbuk (KR); Min-Soo Kim, Daejon (KR); In-Sung Jang, Daejon (KR); Mal-Hee Kim, Daejon (KR); Yong-Joon Lee, Daejon (KR); Jong-Hyun Park, Daejon (KR)

(73) Assignee: Electronics and Telecommunications Research Inst., Daejeon (KR)

( * ) Notice: Subject to any disclaimer, the term of this patent is extended or adjusted under 35 U.S.C. 154(b) by 364 days.

(21) Appl. No.: 11/933,037

(22) Filed: Oct. 31, 2007

(65) Prior Publication Data
US 2008/0109421 A1 May 8, 2008

(30) Foreign Application Priority Data
Nov. 8, 2006 (KR) .................. 10-2006-0110116

(51) Int. Cl.
*G06F 7/00* (2006.01)
(52) U.S. Cl. ................ 707/790; 707/687; 707/756; 707/757; 707/758; 707/759
(58) Field of Classification Search .............. None
See application file for complete search history.

(56) References Cited
U.S. PATENT DOCUMENTS
6,578,046 B2  6/2003  Chang et al.

| | | | |
|---|---|---|---|
| 7,523,462 B1 * | 4/2009 | Nesamoney et al. | 719/318 |
| 7,590,098 B2 * | 9/2009 | Ganesh | 370/338 |
| 2001/0051949 A1 * | 12/2001 | Carey et al. | 707/103 R |
| 2002/0059370 A1 | 5/2002 | Shuster | |

(Continued)

FOREIGN PATENT DOCUMENTS
JP  2006-244120  9/2006

(Continued)

OTHER PUBLICATIONS
Abadi et al., Aurora: a new model and architecture for data stream management, Aug. 2003, Springer-Verlag New York, Inc., vol. 12, Issue 2, pp. 1-20.*

*Primary Examiner*—Srirama Channavajjala
*Assistant Examiner*—Jessica N Le
(74) *Attorney, Agent, or Firm*—H.C. Park & Associates, PLC

(57) ABSTRACT

An apparatus for processing an integrated query from various sensor networks and a method thereof are provided. The apparatus includes an integrated query parser for parsing an integrated query and analyzing a syntax of the parsed integrated query; an integrated query execution plan generator for analyzing meaning of the parsed integrated query and generating an integrated query execution query for processing an integrated query; an integrated query optimizer for optimizing a process time for the generated execution plan based on query information stored in the query information storage and sensor network information stored in the sensor network information storage; and an integrated query executer for detailing the integrated query execution plan by controlling an execution order according to the optimized integrated query and transferring the detailed integrated query execution plan to an event data process executer, a temporal data process executer, and a continuous data process executer.

9 Claims, 6 Drawing Sheets

U.S. PATENT DOCUMENTS

2006/0088012 A1 4/2006 Ganesh
2006/0288014 A1* 12/2006 Edwards et al. ............. 707/100
2009/0083219 A1* 3/2009 Zane et al. .................... 707/2

FOREIGN PATENT DOCUMENTS

| KR | 10-2001-0025949 | 4/2001 |
| KR | 10-2006-0058975 | 6/2006 |
| KR | 10-2006-0070188 | 6/2006 |

* cited by examiner

FIG. 4A

```
CALL event_handler WITH attr1 AS INTEGER, attr2 AS FLOAT
ON sensor_network1
WHEN attr1 = attr2;
```

FIG. 4B

```
SELECT attr3, attr4
FROM sensor_network2
WHERE attr3 < 10 AND attr4 > 20;
```

FIG. 4C

```
SELECT attr5, attr6
FROM sensor_network3
WHERE attr5 = 10 AND attr6 >20
START_TIME = hh1:mm1 AND ENDTIME = hh2:mm2
INTERVAL = 10 SEC;
```

FIG. 5

```
REGISTER INSTANT QUERY
(SELECT attr3, attr4
FROM sensor_network2
WHERE attr3 < 10 AND attr4 > 20) AS instant_query1;
```
(a)

```
REGISTER CONTINUOUS QUERY
(SELECT attr5, attr6
FROM sensor_network3
WHERE attr5 = 10 AND attr6 >20
START_TIME = hh1:mm1 AND ENDTIME = hh2:mm2
INTERVAL = 10 SEC) AS continuous_query1;
```
(b)

```
CALL event_handler WITH attr1 AS INTEGER, attr2 AS FLOAT
ON sensor_network1
WHEN
  instan_query1,attr3 = continuous_query1,attr6;
```
(c)

APPARATUS FOR PROCESSING INTEGRATED QUERY FROM VARIOUS SENSOR NETWORKS AND METHOD THEREOF

CROSS-REFERENCE(S) TO RELATED APPLICATIONS

The present invention claims priority of Korean Patent Application No(s). 10-2006-0110116, filed on Nov. 8, 2006, which is incorporated herein by reference.

BACKGROUND OF THE INVENTION

1. Field of the Invention

The present invention relates to an apparatus for processing an integrated query from various sensor networks and a method thereof, and, more particularly, to an apparatus for processing an integrated query from various sensor networks and a method thereof for processing various types of sensor network data obtained from a plurality of heterogeneous sensor nodes and sensor networks.

This work was partly supported by the Information Technology (IT) research and development program of the Korean Ministry of Information and Communication (MIC) and/or the Korean Institute for Information Technology Advancement (IITA) [2006-S-022-01, "Development of USN Middleware Platform Technology"].

2. Description of Related Art

As various types of sensor networks have been installed and used, it has become important to process various types of data collected or obtained from the sensor networks and to provide the processed data to application program. Also, it has been essentially required to integrally process sensor information and data collected from various sensor networks because the types of sensor networks have become diverse.

The sensor network and data collected or obtained from the various sensor networks can be classified into event data, temporal data, and continuous data according to the types thereof.

The event data is data transferred from a sensor network, not sensed by sensor nodes, and denotes a predetermined process or a predetermined operation. That is, the event data is previously defined data. For example, a fire watch sensor network monitors a peripheral environment by requests from an application program and/or a user terminal. If the first watch sensor network transfers a "fire occurrence" signal to an application program and/or a user terminal as the event data. The data transferred from the sensor network to the application program and/or the user terminal means that a predetermined condition is satisfied, not data itself sensed by a sensor node.

The temporal data is data collected and obtained from a sensor network at a predetermined instant time according to a query processing request of an application program and/or a user terminal and returned to the application program and/or the user terminal. The temporal data may be 'snapshot'. For example, when the fire watch sensor network returns a temperature value that is sensed by each sensor node in real time to the application program and/or the user terminal, the first watch sensor network transfers the temporal data to the application program and/or the user terminal. Unlike the event data, the temporal data is a value sensed by a sensor node. The temporal data can be considered as sensing data captured at a predetermined moment. That is, the temporal data can be considered as stable data.

The continuous data is data sensed by sensor nodes and continuously returned from a sensor network to an application program and/or a user terminal for a predetermined time duration according to a query process request of the application program and/or a user terminal. For example, when the fire watch sensor network senses temperature variation for two hours and returns the sensed temperature variation to the application program and/or the user terminal at the interval of one second according to the request of an application program and/or a user terminal, the fire watch sensor network transfers the continuous data to the application program and/or the user terminal. Unlike the temporal data, the continuous data can be considered as dynamic data because a value sensed by the fire watch sensing network is continuously transferred to an application program and/or a user terminal. The continuous data requires a new processing method differently from the conventional static processing method according to a transferring cycle and the amount of transferred data.

Lately, there have been many studies in progress for developing the method of processing the continuous data. Such a method is similar to a method of processing data stream. Since information to be referred for managing and processing various data types of sensor networks, various properties of data, and methods for processing the data are totally different, a structure of processing data stream is also different.

Although various studies have been in progress for developing technologies for various sensor networks and data types obtained therefrom, there have been not much studies in progress for developing a method for integrally processing various types of sensor data.

Therefore, there is a demand for developing a method for integrally processing various types of sensing information and data, which are collected and obtained from a plurality of heterogeneous sensor networks, using one query.

SUMMARY OF THE INVENTION

An embodiment of the present invention is directed to providing an apparatus for processing an integrated query from various sensor networks and a method thereof for processing various types of sensor network data obtained from a plurality of heterogeneous sensor nodes and sensor networks using one integrated query.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided an apparatus for integrally processing sensor data to process an integrated query of a plurality of heterogeneous sensor networks, the apparatus including: an integrated query parsing unit for parsing an inputted integrated query and analyzing a syntax of the parsed integrated query; an integrated query execution plan generation unit for analyzing meaning of the parsed integrated query and generating an integrated query execution query for processing an integrated query; an integrated query optimizing unit for optimizing a process time for the generated execution plan based on query information and sensor network information; and an integrated query execution unit for detailing the integrated query execution plan by controlling an execution order according to the optimized integrated query from the integrated query optimizing unit and transferring the detailed integrated query execution plan to an event data process execution unit, a temporal data process execution unit, and a continuous data process execution unit.

In accordance with another aspect of the present invention, there is provided a method for processing an integrated query for a plurality of heterogeneous sensor networks in order to process an integrated query for event data, temporal data, and continuous data, including the step of: parsing an inputted integrated query and analyzing syntax of the parsed integrated query; analyzing meaning of the analyzed integrated query and generating an integrated query execution plan for processing the integrated query; optimizing a query execution plan for reducing a process time for the generated execution plan based on query information stored in a query information storing means and sensor network information stored in a sensor network information storing means; detailing the integrated query execution plan to be suitable each data type by controlling an execution order for the optimized integrated query execution plan; performing a query according to an event data process execution plan if the detailed execution plan includes the event data process execution plan; performing a query according to a temporal data process execution plan if the detailed execution plan includes the temporal data process execution plan; performing a query according to a continuous data process execution plan if the detailed execution plan includes the continuous data process execution plan; performing a query according to a post process execution plan if the post process execution plan for obtaining a final result is included after the detailed execution plan is completely processed; and calling a registered event handler according to needs if a data type of the final result is event data.

BRIEF DESCRIPTION OF THE DRAWINGS

FIG. 1 is a diagram illustrating a sensor data integrated processing system for processing an integrated query from various sensor networks where the present invention is applied to.

FIG. 2 is a table for describing various types of sensor network data in accordance with an embodiment of the present invention.

FIG. 4A is a diagram illustrating a query for event data in accordance with an embodiment of the present invention.

FIG. 4B is a diagram illustrating a query for temporal data in accordance with an embodiment of the present invention.

FIG. 4C is a diagram illustrating a query for continuous data in accordance with an embodiment of the present invention.

FIG. 5 is a diagram showing an integrated query for various types of data in accordance with an embodiment of the present invention.

DESCRIPTION OF SPECIFIC EMBODIMENTS

The advantages, features and aspects of the invention will become apparent from the following description of the embodiments with reference to the accompanying drawings, which is set forth hereinafter.

Figures 1, 2:
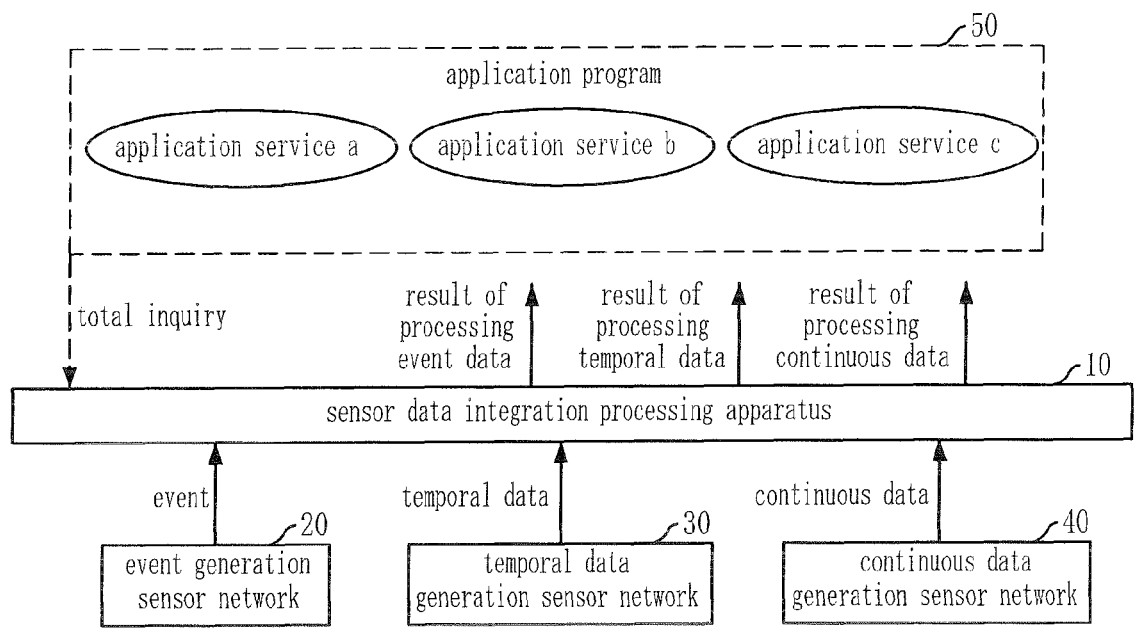

FIG. 1 is a diagram illustrating a sensor data integrated processing system for processing an integrated query from various sensor networks where the present invention is applied to.

As shown in FIG. 1, the sensor data integrated processing system for processing an integrated query of various sensor networks where the present invention is applied to includes a sensor data integrated processing apparatus 10, an event generation sensor network 20, a temporal data generation sensor network 30, a continuous data generation sensor network 40, and an application program 50. The sensor data integrated processing apparatus 10 is disposed between a plurality of heterogeneous sensor networks 20, 30, and 40 and the application program 50. The sensor data integrated processing apparatus 10 processes an integrated query for various types of sensor network data such as event data, temporal data, and continuous data using one query. The event generation sensor network 20, the temporal data generation sensor network 30, and the continuous data generation sensor network 40 connect sensor nodes to enable sensor nodes for sensing the information of peripheral environment to communicate with each others. The application program 50 is for using data transferred from a plurality of heterogeneous sensor networks 20, 30 and 40.

The sensor data integrated processing apparatus 10 makes physically divided heterogeneous sensor networks 20, 30, and 40 to be seen as one sensor network by processing data for a plurality of heterogeneous sensor networks 20, 30, and 40 as one query. The result of integrally processing sensor data may be one of event data, temporal data, and continuous data according to the integrated query transferred from an application program and/or a user terminal to the sensor data integrated processing apparatus 10. The sensor data integrated processing apparatus 10 can interconvert and continuously process sensor information and data of the heterogeneous sensor networks 20, 30, and 40.

The event data means that information transferred from the event generation sensor network 20 according to a query requested from an application program and/or a user terminal is data denoting a predetermined process or a predetermined operation transferred from the event generation sensor network 20, not data selected by sensor nodes. The temporal data is data collected or obtained at a predetermined moment like snapshot by the temporal data generation sensor network 30 and returned to the application program and/or the user terminal. The continuous data is data sensed by sensor nodes for a predetermined time duration, which is continuously returned to the application program and/or the user terminal.

FIG. 2 is a table for describing various types of sensor network data in accordance with an embodiment of the present invention.

As shown in FIG. 2, the event data can be obtained by generating a predetermined value denoting a predetermined process if a predetermined condition is satisfied while the temporal data or the continuous data is processing. The temporal data can be obtained by collecting a predetermined part of the continuous data or repeatedly collecting a predetermined part.

However, it is impossible to convert the event data to the temporal data or the continuous data. Also, it is impossible to convert the temporal data to the continuous data.

However, it is obvious to those skilled in the art that the event data can be easily transformed to event data in other data format, the temporal data can be easily transformed to temporal data in other data format, and the continuous data can be easily transformed to continuous data in other data format.

Figure 3:
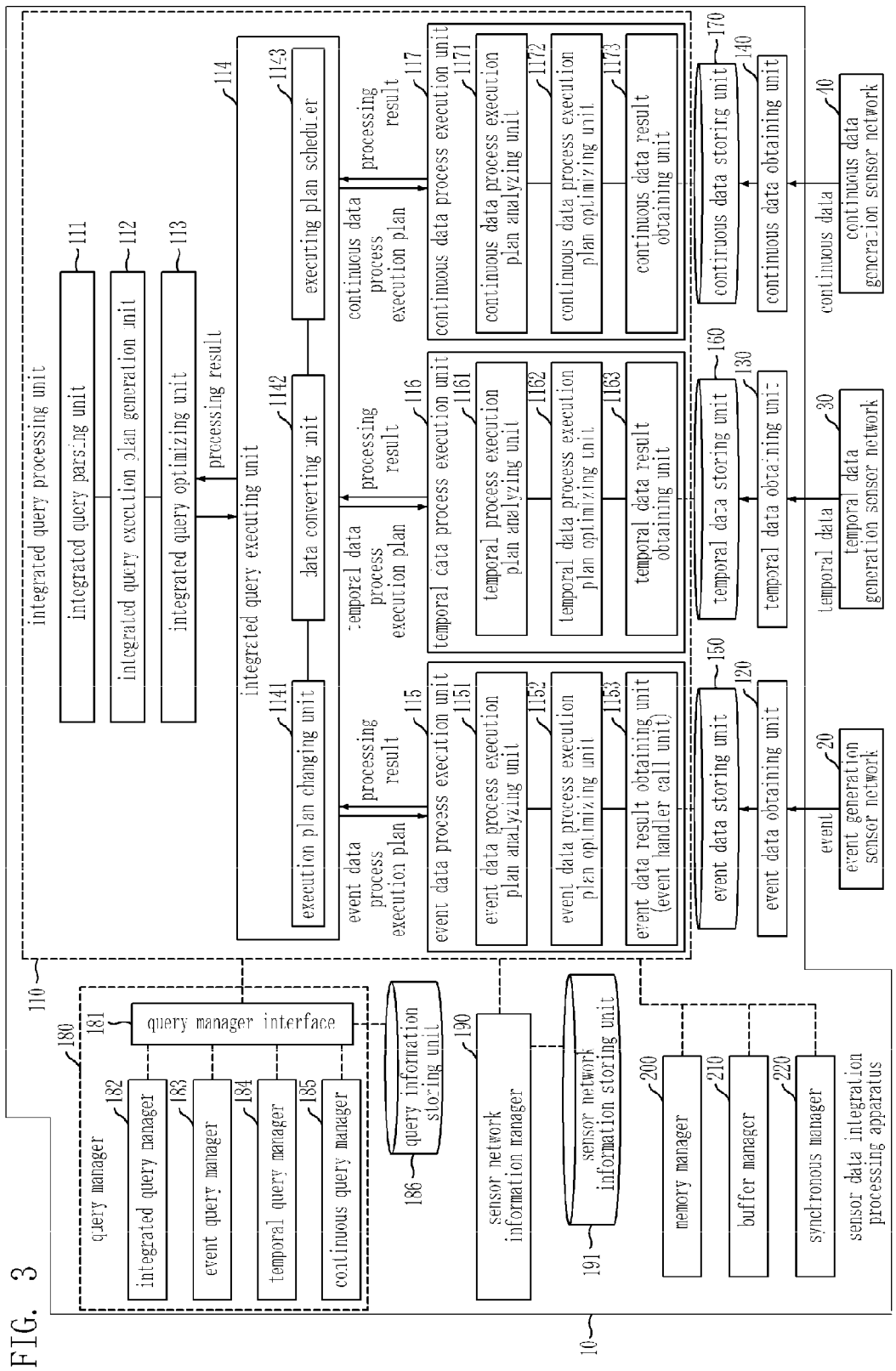
FIG. 3 is a block diagram illustrating an apparatus for integrally processing sensor data in accordance with an embodiment of the present invention.

FIG. 3 is a block diagram illustrating an apparatus for integrally processing sensor data in accordance with an embodiment of the present invention.

Referring to FIG. 3, the sensor data integrated processing apparatus 10 includes an integrated query processor 110, an event data obtaining unit 120, a temporal data obtaining unit 130, a continuous data obtaining unit 140, an event data storing unit 150, a temporal data storing unit 160, a continuous data storing unit 170, a query managing unit 180, a sensor network information manager 190, a memory manager 200, a buffer manager 210, and a synchronous manager 220. The integrated query processing unit 110 analyzes and process an integrated query for various types of sensor data such as event data, temporal data, and continuous data, which are requested from an application program or/and a user terminal. The event data obtaining unit 120 obtains event data transferred from the event generation sensor network 20. The temporal data obtaining unit 130 obtains temporal data transferred from the temporal data generation sensor network 30. The continuous data obtaining unit 140 obtains continuous data transferred from the continuous data generation sensor network 40. The event data storing unit 150 stores event data obtained through the event data obtaining unit 120. The temporal data storing unit 160 stores temporal data obtained through the temporal data obtaining unit 130. The continuous data storing unit 170 stores continuous data obtained through the continuous data obtaining unit 140. The query managing unit 180 registers, stores and manages property information for each query of various data, such as event query, temporal query, and continuous query, which are requested through the integrated query processing unit 110. The sensor network information manager 190 stores all information about a plurality of heterogeneous sensor networks 20, 30, and 40 for generating various types of data in the network information storing unit 191 and sustains and manages the stored information. The memory manager 200 manages dynamic allocation and release of memory used by the integrated query processing unit 110. The buffer manager 210 provides various buffering schemes and an access interface for a buffer space in order to improve the query processing performance of the integrated query processor 110. The synchronous manager 220 provides a necessary synchronization scheme in order to simultaneously process various queries in the integrated query processing unit 110.

The query manager 180 includes a query managing unit interface 181, an integrated query manager 182, an event query manager 183, a temporal query manager 184, a continuous query manager 185, and a query information storing unit 186. The query manager interface 181 provides an interface between the integrated query processing unit 100 and the integrated query manager 182, the event query manager 183, the temporal query manager 184, or the continuous query manager 185. The integrated query manager 182 stores information about the integrated query requested through the integrated query processing unit 110 in the query information storing unit 196 and manages the stored information. The event query manager 183 stores the information about event data query in the query information storing unit 186 and manages the stored data. The temporal query manager 184 stores information about temporal data query in the query information storing unit 186 and manages the stored information. The continuous query manager 185 stores information about continuous data query in the query information storing unit 186 and manages the stored information.

The query information stored in the query information storing unit 186 includes registration information such as a registration time, registration date, registered user, and the valid duration of each query, information about states of processing a query such as registered, in process, phase, processed, and error states, and property information such as ID information for a sensor network to access for processing a related query. The integrated query processing unit 110 can obtain information about processed query, query in process, requested query to process from the query information storing unit 186 through the query management interface 181.

The sensor network information manager 190 stores and manages information about a plurality of heterogeneous networks 20, 30, and 40 generating various types of data, which is obtained from the application program or/and the user terminal, in the sensor network information storing unit 191. The sensor network information includes information about a policy and a method for obtaining each sensor network data, properties about each data type obtained from a sensor network, configuration information of sensor networks, and performance information thereof.

The synchronous manager 220 schedules an order of processing queries or controls queries not to compete for the same data through a synchronization scheme. Such a synchronization scheme includes Lock, Mutex, and Semaphore, which are widely provided from an operating system (OS) or a database management system (DBMS).

The integrated query processing unit 110 analyzes an integrated query for various types of sensor data such as event data, temporal data, and continuous data, which are transferred from an application program and/or a user terminal, to determine whether the integrated query can be processed suitable to a predetermined data type. According to the result of the analysis, the integrated query processing unit 110 classifies the processable integrated query to a query of a predetermined data and processes the classified integrated query. That is, since a data processing method is different according to each data type, the integrated query is classified by data type. After the integrated query processing unit 110 processes the classified integrated query, the integrated query processing unit 110 also processes the processed query related to the other data types if necessary, thereby providing a final processing result. For example, the processed query is processed again with consideration of the other data types if it is required to refer both of the temporal data and the continuous data, or to refer the meaning of predetermined event data and the pattern of the continuous data.

The integrated query processing unit 110 includes an integrated query parsing unit 111, an integrated query execution plan generation unit 112, an integrated query optimizing unit 113, an integrated query execution unit 114, an event data process execution unit 115, a temporal data process execution unit 116, and a continuous data process execution unit 117. The integrated query parsing unit 111 parses an integrated query requested from an application program and/or a user terminal, and inspects whether the query has a grammatical error through performing syntax analysis on the sentence of the parsed integrated query. The integrated query execution plan generation 112 analyzes the meaning of the parsed and analyzed integrated query from the integrated query parsing unit 111 and generates an integrated query execution plan based on the analyzing result. The integrated query optimizing unit 113 optimizes the execution plan generated by the integrated query execution plan generation unit 112 based on query information such as data type information stored in the query information storing unit 186 and sensor network information stored in the sensor network information storing unit 191. The integrated query execution unit 114 converts the integrated query execution plan to be suitable to each data type according to the optimized integrated query execution plan and transfers the converted query execution plan to each of the event data process execution unit 115, the temporal data process execution unit 116, and the continuous data process execution unit 117 by controlling an execution order of the converted execution plan. The event data process execution unit 115 processes query for event data according to the process execution plan transferred from the integrated query execution unit 114. The temporal data process execution unit 116 processes query for temporal data according to the process execution plan transferred from the integrated query execution unit 114. The continuous data process execution unit 117 processes query for continuous data according to the process execution plan transferred from the integrated query execution unit 114.

The integrated query execution plan generated from the integrated query execution plan generation unit 112 is an execution plan using a data process and a query request for a predetermined sensor network as a basic unit. That is, the integrated query execution plan denotes a data process for a predetermined sensor network as an execution unit, not a query process for one sensor network as a basic unit. If an integrated query requested from an application program and/or a user terminal is a query for various sensor networks or a query for various different data types, it needs to perform a post process on the result of processing the query for one sensor network with reference to each others. The integrated query execution plan generation unit 112 also generates an execution plan for the post process.

The optimizing of the integrated query execution plan means to control an execution plan in order to maximally reduce a time of processing the integrated query in the event data process execution unit 115, the temporal data process execution unit 116, and the continuous data process execution unit 117.

The integrated query execution unit 114 includes an execution plan changing unit 1141, a data converting unit 1142, and an execution plan scheduler 1143. The execution plan changing unit 1141 further classifies the optimized integrated query execution plan from the integrated query optimizing unit 113 to include processes/calculations of a predetermined sensor network in the execution plan, or changes the execution plan according to data types. The data converting unit 1142 converts a predetermined type of data such as event data, temporal data, and continuous data to the other type of data in consideration of convertible data type shown in FIG. 2. The execution plan scheduler 1143 controls the execution order of the optimized integrated query execution plan transferred from the integrated query optimizing unit 113.

The event data process execution unit 115 includes an event data process execution plan analyzing unit 1151, an event data process execution plan optimizing unit 1152, and an event data result obtaining unit 1153 that is an event hander calling unit. The event data process execution plan analyzing unit 1151 analyzes the syntax and the meaning of an event data process execution plan transferred from the integrated query execution unit 114. The event data process execution plan optimizing unit 1152 optimizes the event data process execution plan to optimize the event data process. The event data result obtaining unit 1153 processes event data stored in an event data storing unit 150 according to the optimized event data process execution plan from the event data process execution plan and obtains the processing result.

Unlike the optimization of the integrated query optimizing unit 113, the event process execution optimizing unit 1152 only optimizes an event data process. That is, the event process execution plan optimizing unit 1152 controls an execution plan to maximally reduce a time of processing event data. The event data result obtaining unit 1153 may be constituted of event handlers designed to process a predetermined event.

The temporal data process execution unit 116 includes a temporal data process execution analyzing unit 1161, a temporal data process execution plan optimizing unit 1162, and a temporal data result obtaining unit 1163. The temporal data process execution analyzing unit 1161 analyzes a syntax and a meaning of a temporal data process execution plan transferred from the integrated query execution unit 114. The temporal data process execution plan optimizing unit 1162 optimizes the temporal data process execution plan for optimizing the temporal data process. The temporal data result obtaining unit 1163 processes temporal data stored in the temporal data storing unit 160 according to the optimized temporal data process execution plan from the temporal data process execution plan optimizing unit 1162 and obtains the result of processing the temporal data.

Unlike the integrated query optimizing unit 113, the temporal data process execution plan optimizing unit 1162 optimizes only a process for temporal data. That is, the temporal data process execution plan optimizing unit 1162 controls the execution plan to maximally reduce a time of processing temporal data.

The continuous data process execution unit 117 includes a continuous data process execution plan analyzing unit 1171, a continuous data process execution plan optimizing unit 1172, and a continuous data result obtaining unit 1173. The continuous data process execution plan analyzing unit 1171 analyzes a syntax and a meaning of the continuous data process execution plan from the integrated query execution unit 114. The continuous data process execution plan optimizing unit 1172 optimizes the continuous data process execution plan for optimizing the continuous data process. The continuous data result obtaining unit 1173 processes the continuous data stored in the continuous data storing unit 170 according to the optimized continuous data process execution plan from the continuous data process execution plan optimizing unit 1172 and obtains the result of processing the continuous data.

Unlike the integrated query optimizing unit 113, the continuous process execution plan optimizing unit 1172 optimizes the execution plan only in consideration of the continuous data process. That is, the continuous process execution plan optimizing unit 1172 controls the execution plan to maximally reduce a time of processing the continuous data.

FIG. 4A is a diagram illustrating a query for event data in accordance with an embodiment of the present invention.

As shown in FIG. 4A, a query for event data used in the present embodiment has meaning of calling an event hander 'event_handler' using an integer type of an attribute 'attri1' and a float type of an attribute 'attr2' when the attributes 'attr1' and 'attr2' becomes the same in a sensor network 'sensor_network1'.

Since the event data query in the present embodiment is a query for one sensor network 'sensor_network1', an execution plan only for 'sensor_network1' is only generated and processed without a post process execution plan for integrally process the results from various sensor networks. If the sensor network 'sensor_network1' generates continuous data instead of generating event data, the sensor data integrated processing apparatus 10 obtains data from a sensor network 'sensor_network1' and processes the obtained data. If conditions defined in the query are satisfied, the sensor data integrated processing apparatus 10 can directly call an event handler 'event_handler'. It is possible because event data is obtained from temporal data or continuous data through proper data process as described with reference to FIG. 2.

FIG. 4B is a diagram illustrating a query for temporal data in accordance with an embodiment of the present invention.

As shown in FIG. 4B, the query for temporal data has meaning of outputting the values of attributes 'attr3' and 'attr4' if the attribute 'attr3' is smaller than 10 and the attribute 'attr4' is larger than 20 for a sensor network 'sensor_network2'.

Since the temporal data query used in the present embodiment is a query for one sensor network 'sensor_network2', it is only required to generate and properly process an execution plan for the sensor network 'sensor_network2' without a post process execution plan for integrally processing results from various sensor networks. If the sensor network 'sensor_network2' generates continuous data instead of generating temporal data, the sensor data integrated processing apparatus 10 obtains data from the sensor network 'sensor_network2' and processes the obtained data. Then, the sensor data integrated processing apparatus 10 outputs attributes 'attr3' and 'attr4' as temporal data if conditions defined in the query are satisfied. It is possible because temporal data is obtained from continuous data through a proper data process as described above with reference to FIG. 2.

Since a query for temporal data cannot be executed if the sensor network 'sensor_network2' is a sensor network generating event data, error is generated. It is because temporal data cannot be obtained from event data although the temporal data can obtain from temporal data.

FIG. 4C is a diagram illustrating a query for continuous data in accordance with an embodiment of the present invention.

As shown in FIG. 4C, a query for continuous data used in the present embodiment has means of continuously outputting the values of attributes 'attr5' and 'attr6' at an interval of 10 seconds from a time of 'hh1:mm1' to a time of 'hh2:mm2' if the attribute 'attr5' is 10 and the attribute 'attr6' is larger than 20 for a sensor network 'sensor_network3'.

Since the query for continuous data used in the present embodiment is a query for one sensor network 'sensor_network3', it is required only to generate and properly process an execution plan for a sensor network 'sensor_network3' without a post process execution plan for integrally processing results from various sensor networks.

If the sensor network 'sensor_network3' generates event data or temporal data instead of generating continuous data, error is generated because the query for continuous data cannot be executed. It is because that the continuous data cannot be extracted from the event data or the temporal data.

FIG. 5 is a diagram showing an integrated query for various types of data in accordance with an embodiment of the present invention. FIG. 5 shows an integrated query for integrally processing various types of data.

As shown in FIG. 5, a block (a) registers a temporal query shown in FIG. 4B into the sensor data integrated processing apparatus 10 as an name of 'instant_query1' using a keyword 'REGISTER' that is reserved for defining a query of the sensor data integrated processing apparatus 10. A block (b) registers a continuous query shown in FIG. 4C in the sensor data integrated processing apparatus 10 as a name of 'continuous_query1'. If the temporal query and the continuous query (a) and (b) are registered at the sensor data integrated processing apparatus 10, a query requested from an application program and/or a user terminal can refer the registered temporal and continuous queries. A block (c) denotes a query that calls an event handler 'event_handler2' using the values of an integer type attribute 'attr1' and a float type attribute 'attr2' for a sensor network 'sensor_network1' as factors if the attribute 'attr3' and the attribute 'attr6' are the same after the sensor data integrated processing apparatus 10 executes the previously registered 'instant_query1' and 'continuous_query1'. In order to process the query shown in the block (c), the sensor data integrated processing apparatus 10 processes the temporal query registered as 'instant_query1' and the continuous query registered as 'continuous_query2'. The sensor data integrated processing apparatus 20 calls an event handler 'event_hander2' if conditions given by performing a post process based on the processing result are satisfied.

The integrated query processing unit 110 in the sensor data integrated processing apparatus 10 according to the present embodiment generates an integrated query execution plan and process the generated execution plan based on the integrated query shown in FIG. 5 as follows.

At first, the integrated query parsing unit 111 of the integrated query processing unit 110 parses the blocks (a), (b), and (c), performs syntax analysis on the parsing result, and extracts necessary keywords.

Then, the integrated query execution plan generation unit 112 generates an execution plan to process the query of FIG. 5 as follows.

1. a query 'instant_query1' is executed.
2. execution plan 2, a query 'continuous_query1' is performed.
3. the results of performing queries 'instant_query1' and 'continuous_query1' are compared.
4. a case that attributes 'attr3' and 'attr6' are the same is searched from the compared execution results.

In execution plan 5, an event handler 'event_handler2' is called.

Then, the integrated query optimizing unit 113 optimizes the execution plan generated by the integrated query execution plan generation unit 112 as follows in order to reduce a time of processing a query processing time. Then, the integrated query optimizing unit 113 transfers the optimized execution plan to the integrated query execution unit 114.

1. a query 'instant_query1' is executed.
2. a query 'continuous_query1' is executed.
3. the results of executing the queries 'instant_query1' and 'continuous_query1' are compared and a case that attributes 'attr3' and 'attr6' are the same is searched from the execution results.
4. an event handler 'event_handler2' is called.

Then, the execution plan scheduler 1143 of the integrated query execution unit 114 decides an execution order by performing the step S1 for executing the query 'instant_query1' in order to perform the optimized execution plan with the improved performance. Then, the decided execution order is transferred to the execution plan changing unit 1141.

Then, the execution plan converting unit 1141 minutely divides the optimized execution plan according to the query execution order transferred from the execution plan scheduler 1143 as follows.

1-1. a network 'sensor_network2' is accessed.
1-2. data having an attribute 'attr3' smaller than 10 is fetched.
1-3. data having an attribute 'attr4' larger than 20 is fetched.
1-4. the intersection of the fetched data having the attribute 'attr3' smaller than 10 and the fetched data having the attribute 'attr4' larger than 20 is obtained.
2-1. a sensor network 'sensor_network3' is accessed.
2-2. data having an attribute 'attr5' equal to 10 is fetched for a given time (start_time, end-time).
2-3. data having an attribute 'attr6' larger than 20 is fetched for a given time (start_time, end-time).

2-4. the intersection of the fetched data having the attribute 'attr4' equal to 10 and the fetched data having the attribute 'attr5' larger than 20 is calculated.

Then, the execution plan converting unit 1141 transfers the execution plans 1-1 to 1-4 and the execution plans 2-1 to 2-4 to the temporal data process execution unit 115 and the continuous data process execution unit 116, respectively. Then, the temporal data process execution unit 115 and the continuous data process execution unit 116 analyze and optimize the execution plans 1-1 to 1-4 and 2-1 to 2-4. After optimizing, the temporal data process execution unit 115 and the continuous data process execution unit 116 perform queries according to the optimized execution plan and transfer the performing result to the data converting unit 1142 of the integrated query execution unit 114.

The data converting unit 1142 converts one of the types of the performing results to have the same data format in order to compare the performing results from the temporal data process execution unit 115 and the continuous data process execution unit 116 and if the execution results from the temporal data process execution unit 115 and the continuous data process execution unit 116 are different in a data format, for example, if a performing result 'instant_query1.attr3' is an integer type and a performing result 'instant_query1.attr6' is a float type.

As described above, the integrated query processing unit 110 generates an integrated query execution plan for the integrated query shown in FIG. 5 and processes the generated execution plan.

Figure 6A:
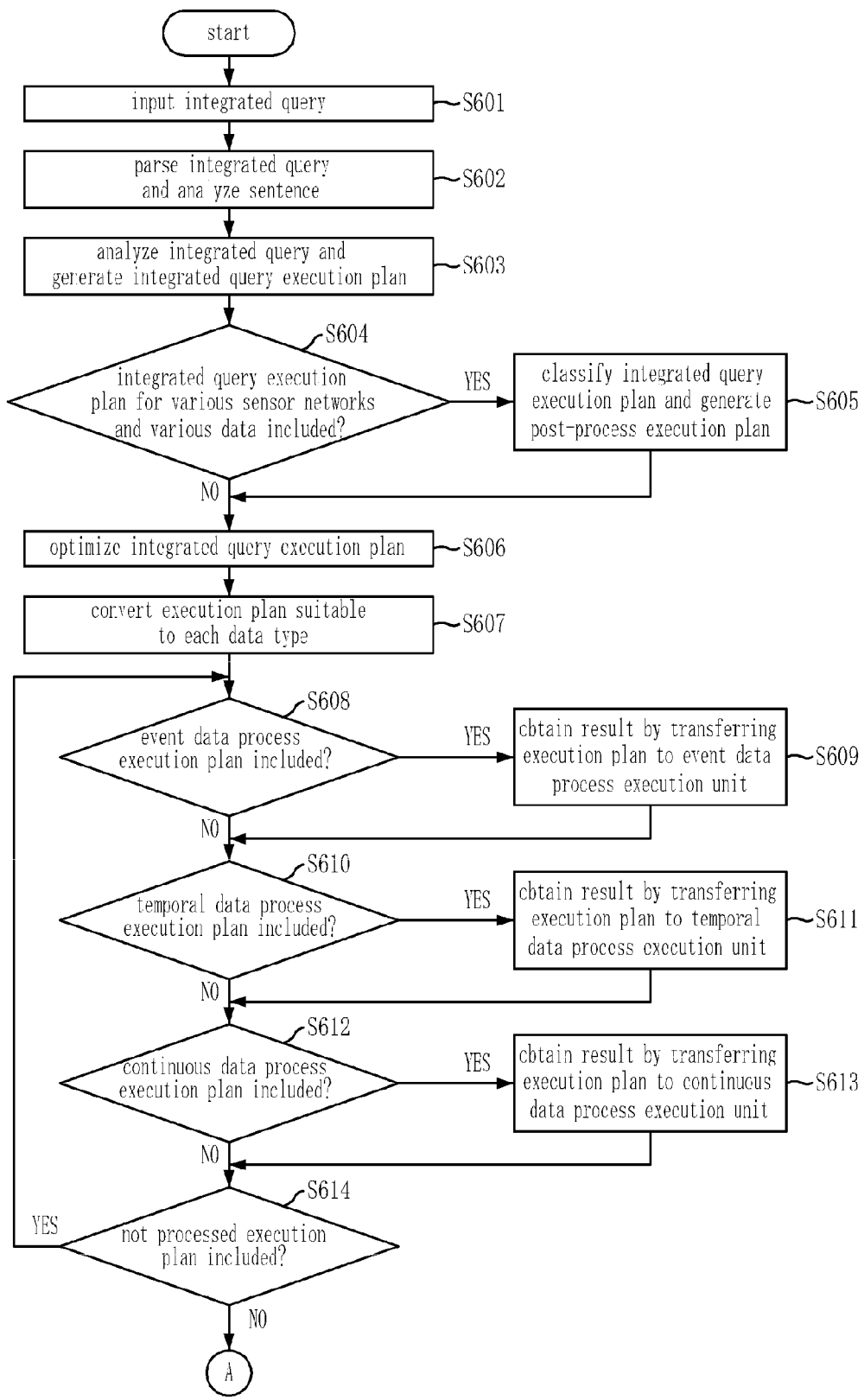
FIGS. 6A and 6B are flowcharts illustrating a method for processing an integrated query of various sensor network in accordance with an embodiment of the present invention.
Figure 6B:
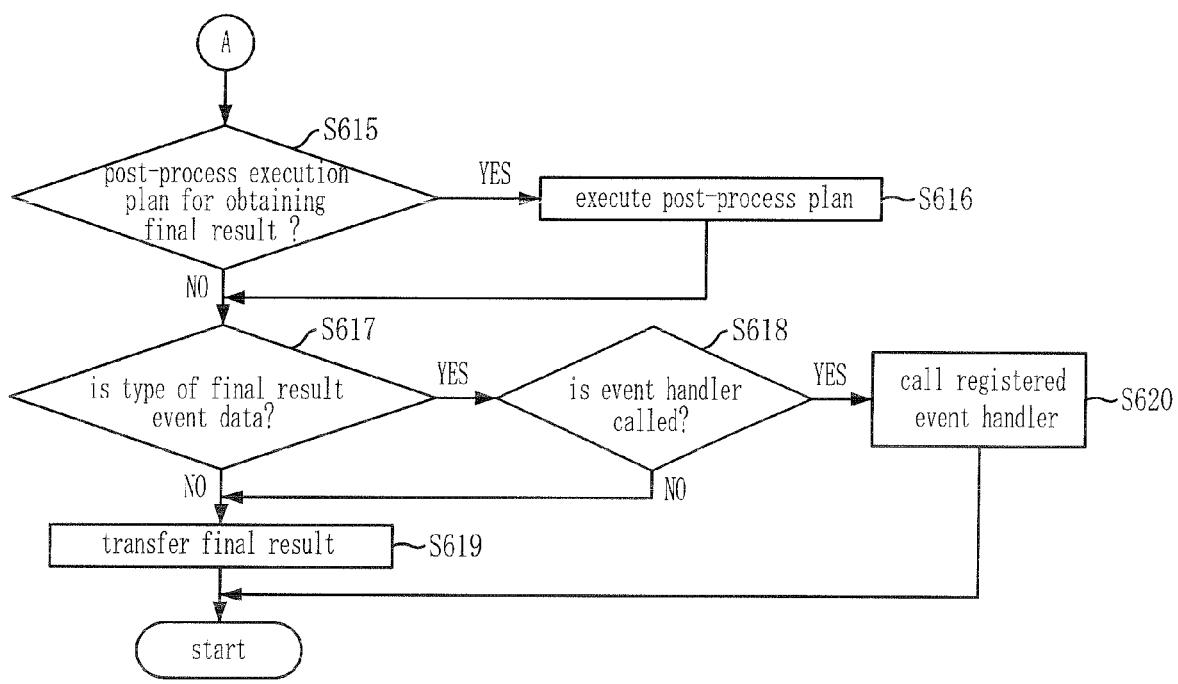

FIGS. 6A and 6B are flowcharts illustrating a method for processing an integrated query of various sensor networks in accordance with an embodiment of the present invention.

Referring to FIGS. 6A and 6B, the integrated query parsing unit 111 of the integrated query processing unit 110 in the sensor data integrated processing apparatus receives an integrated query from an application program and/or a user terminal at step S601. The integrated query parsing unit 111 parses the inputted integrated query based on the query information stored in a query information storing unit 186 and analyzes a syntax of the parsed integrated query at step S602.

When the integrated query processing unit 110 receives the integrated query from the application program and the user terminal, the integrated query manager 182 of the query manager 180 stores the integrated query inputted from the integrated query processing unit 110 through the query manager interface 181 in the query information storing unit 186. Then, the sensor network information manager 190 stores sensor network information obtained from the application program and/or the user terminal, such as a policy and a method for obtaining sensor network data, information about attributes for each of obtained data types, configuration information of other sensor networks, and performance information thereof in the sensor network information storing unit 191.

At step S603, the integrated query execution plan generation unit 112 of the integrated query processing unit 110 analyzes the meaning of the integrated query and generates an integrated query execution plan in order to process the parsed and analyzed integrated query from the integrated query parsing unit 111. At step S604, the integrated query execution plan generation unit 112 determines whether the generated integrated query execution plan includes an execution plan of the integrated query for various sensor networks and data types. If the generated integrated query execution plan includes the execution plan of the integrated query for various sensor networks and the data types, the integrated query execution plan generation unit 112 classifies the integrated query execution plan according to types of sensor networks and data based on the query information stored in the query information storing unit 186 and generates a post process execution plan according to each sensor network and data type at step S605.

Then, the integrated query optimizing unit 113 of the integrated query processing unit 110 optimizes the execution plan generated by the integrated query execution plan generation unit 112 in consideration of a corresponding sensor network and a corresponding data type based on the query information stored in the query information storing unit 186 and sensor network information stored in the sensor network information storing unit 191 at step S606.

The optimization of the execution plan in the integrated query optimizing unit 113 will be described with reference to the query of FIG. 4B. If the integrated query execution plan generation unit 112 generates the execution plans for the query shown in FIG. 4B in an order of 1. a sensor network 'sensor_network2' is accessed, 2. an attribute 'attr3' smaller than 10 is fetched, 3. an attribute 'attr4' larger than 20 is fetched, 4. an intersection of the attribute 'attr3' smaller than 10 and the attribute 'attr4' larger than 20 is calculated, and 5. the calculated intersection is outputted, the integrated query optimizing unit 113 controls the generated execution plan in an order of 1. a sensor network 'sensor_network2' is accessed, 2. an attribute 'attr3' smaller than 10 and an attribute 'attr4' larger than 20 are fetched, and 3. the fetched attributes 'attr3' and 'attr4' are outputted', thereby reducing the query process time. Also, the optimization of the execution plan in the integrated query optimizing unit 113 will be described with reference to the query shown in FIG. 4C. If the integrated query execution plan generation unit 112 generates an execution plan of "performing a query process by accessing a sensor network 'sensor_network3' at every 10 second", the integrated query optimizing unit 113 controls the generated execution plan to "a query process is performed by always connecting the sensor network 'sensor_network3'" in order to reduce overhead for accessing a related sensor network to fetch data. Therefore, a query processing time can be reduced.

Then, the integrated query execution unit 114 of the integrated query processing unit 110 converts an execution plan to be suitable to each data type according to the optimized execution plan from the integrated query optimizing unit 113 at step S607. Then, it is determined whether the converted execution plan includes an event data process execution plan or not at step S608. If the execution plan includes the event data process execution plan, the event data execution plan is transferred to the event data process execution unit 115 and the event data is processed according to the transferred event data process execution plan at step S609. Then, at step S610, it is determined whether the execution plan includes a temporal data process execution plan or not. If the execution plan includes a temporal data process execution plan, the temporal data execution plan is transferred to the temporal data process execution unit 116 and the temporal data is processed according to the transferred temporal data process execution plan at step S611. Then, at step S612, it is determined whether the execution plan includes a continuous data process execution plan or not. If the execution plan includes the continuous data process execution plan, the continuous data execution plan is transferred to the continuous data process execution unit 117 and the continuous data is processed according to the transferred temporal data process execution plan at step S613.

Then, the event data process execution unit 115, the temporal data process execution unit 116, and the continuous data process execution unit 117 process event data, temporal data, and continuous data according to event data, temporal data, and continuous data stored in the event data storing unit 150, the temporal data storing unit 160, and the continuous data storing unit 170.

Then, the integrated query execution unit 114 checks whether unprocessed execution plans remain or not at step S614. If the unprocessed execution plans remains, the step S608 is performed again. If not, it is determined whether a post process execution plan is provided or not for obtaining a final result by integrally processing the result for each execution plan of a predetermined data type at step S615. If the post process execution plan is provided, the post process execution plan is performed at step S616.

The integrated query execution unit 114 determines whether the data type of the final result is event data or not at step S617. If the data type of the final result is event data, it is determined whether it is required to call an event handler or not at step S618.

If the data type of the final result is not the event data or it is not required to call the event handler at step S618, the integrated query processing unit 110 provides the final result of data to the application program and/or the user terminal at step S619.

If it is required to call the event handler at step S618, the event data result obtaining unit 1153 of the event data process execution unit 115 processes a predetermined event by calling a registered event handler at step S620.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the spirits and scope of the invention as defined in the following claims.

As described above, the apparatus for processing an integrated query from various sensor networks and the method thereof according to the present invention enable to process various sensor information and data and to process data from a plurality of heterogeneous sensor networks using one query. Therefore, data from a plurality of heterogeneous sensor networks, which have different characteristics and physically divided, can be effectively processed, and a plurality of heterogeneous sensor networks can be easily accessed through one interface. Furthermore, a method for effectively access and managing a plurality of heterogeneous sensor networks can be provided to an application program and/or a user terminal.

What is claimed is:

1. An apparatus comprising a processor to integrally process an integrated query for sensor data of a plurality of heterogeneous sensor networks, the processor comprising:
an integrated query parsing unit to parse the integrated query and to analyze a syntax of the parsed integrated query;
an integrated query execution plan generation unit to analyze a meaning of the parsed integrated query and to generate an integrated query execution plan for processing the integrated query;
an integrated query optimizing unit to optimize a process time for the generated integrated query execution plan based on query information and sensor network information; and
an integrated query execution unit to detail the integrated query execution plan by controlling an execution order according to the optimized integrated query from the integrated query optimizing unit and to transfer the detailed integrated query execution plan to an event data process execution unit, a temporal data process execution unit, and a continuous data process execution unit according to the sensing data of the integrated query, the sensing data comprising at least two types of data among event data, temporal data, and continuous data,
wherein continuous data is data sensed by a first heterogeneous sensor network and continuously returned to the apparatus, and temporal data is data sensed by a second heterogeneous sensor network and returned to the apparatus at a predetermined time, and
wherein the integrated query execution unit comprises:
an execution plan scheduling unit to decide an execution order for the optimized integrated query execution plan from the integrated query optimizing unit;
an execution plan changing unit to detail the optimized integrated query execution plan according to a query performing order inputted from the execution plan scheduling unit, including a process of a predetermined sensor network in an execution plan or changing an execution plan according to a data type to process, and transferring the integrated query execution plan to the event data process execution unit, the temporal data process execution unit, or the continuous data process execution unit; and
a data converting unit to convert event data, temporal data, or continuous data, which is transmitted from the event data process execution unit, the temporal data process execution unit, or the continuous data process execution unit as a result of the integrated query, to a predetermined data type.

2. The apparatus of claim 1, wherein the integrated query execution unit analyzes the integrated query for inputted sensing data to determine whether the integrated query is able to be processed to be suitable to a predetermined data type, classifies a processable integrated query into a query for a predetermined data type according to the analyzing result, and processes the classified query.

3. The apparatus of claim 1, wherein if the execution results transferred from the temporal data process execution unit and the continuous data process execution unit are in different data formats, the data formats of the execution results are converted by the data converting unit to match.

4. The apparatus of claim 1, wherein the event data process execution unit comprises:
an event data process execution analyzing unit to analyze a syntax and a meaning of an event data process execution plan transferred from the execution plan scheduling unit;
an event data process execution plan optimizing unit to reduce a process time for the analyzed event data process execution plan from the event data process execution plan analyzing unit; and
an event data result obtaining unit to process a query for event data according to the optimized event data process execution plan from the event data process execution plan optimizing unit.

5. The apparatus of claim 1, wherein the temporal data process execution unit comprises:

a temporal data process execution analyzing unit to analyze a syntax and a meaning of a temporal data process execution plan transferred from the execution plan scheduling unit;

a temporal data process execution plan optimizing unit to reduce a process time for the analyzed temporal data process execution plan from the temporal data process execution plan analyzing unit; and a temporal data result obtaining unit to process a query for temporal data according to the optimized temporal data process execution plan from the temporal data process execution plan optimizing unit.

6. The apparatus of claim 1, wherein the event data is obtained from the temporal data and the continuous data through data conversion if a predetermined condition is satisfied.

7. The apparatus of claim 1, wherein the temporal data is obtained by extracting a predetermined part from the continuous data and by repeatedly extracting a predetermined part from the continuous data.

8. A method for processing an integrated query for a plurality of heterogeneous sensor networks by an apparatus comprising a processor, a query information storing unit, and a sensor network information storing unit, in order to process an integrated query according to the sensing data of the integrated query, the sensing data comprising at least two types of data among event data, temporal data, and continuous data, the method comprising the step of:

parsing the integrated query and analyzing syntax of the parsed integrated query;

analyzing a meaning of the analyzed integrated query and generating an integrated query execution plan for processing the integrated query;

optimizing the integrated query execution plan for reducing a process time for the generated integrated query execution plan based on query information stored in the query information storing unit and sensor network information stored in the sensor network information storing unit;

detailing the integrated query execution plan to be suitable for each data type by controlling an execution order for the optimized integrated query execution plan;

performing a query according to an event data process execution plan if the detailed integrated query execution plan includes the event data process execution plan;

performing a query according to a temporal data process execution plan if the detailed integrated query execution plan includes the temporal data process execution plan;

performing a query according to a continuous data process execution plan if the detailed integrated query execution plan includes the continuous data process execution plan;

performing a query according to a post process execution plan if the post process execution plan for obtaining a final result is included after the detailed integrated query execution plan is completely processed; and calling a registered event handler according to needs if a data type of the final result is event data, wherein continuous data is data sensed by a first heterogeneous sensor network and continuously returned to the apparatus, and temporal data is data sensed by a second heterogeneous sensor network and returned to the apparatus at a predetermined time, and the method further comprises:

converting an execution result data format for matching data formats of execution results if a data format obtained by the temporal data process execution plan and a data format obtained by the continuous data process execution plan are different, wherein the event data is obtained from the temporal data or the continuous data through data conversion if a predetermined condition is satisfied, and wherein the temporal data is obtained by extracting a predetermined part from the continuous data or by repeatedly extracting a predetermined part from the continuous data.

9. The method of claim 8, wherein the step of detailing the integrated query execution plan includes the steps of:

deciding an execution order for the optimized integrated query execution plan; and detailing the optimized integrated query execution plan according to the decided execution order, and including a process of a predetermined sensor network in an execution plan or changing an execution plan according to a data type to process.

* * * * *